United States Patent
Lin et al.

(10) Patent No.: US 10,752,246 B2
(45) Date of Patent: *Aug. 25, 2020

(54) SYSTEM AND METHOD FOR ADAPTIVE CRUISE CONTROL WITH PROXIMATE VEHICLE DETECTION

(71) Applicant: TuSimple, Inc., San Diego, CA (US)

(72) Inventors: Wutu Lin, San Diego, CA (US); Liu Liu, San Diego, CA (US); Zijie Xuan, San Diego, CA (US); Xing Sun, San Diego, CA (US); Kai-Chieh Ma, San Diego, CA (US); Yufei Zhao, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/806,127

(22) Filed: Nov. 7, 2017

(65) Prior Publication Data

US 2019/0001977 A1    Jan. 3, 2019

Related U.S. Application Data

(63) Continuation-in-part of application No. 15/640,516, filed on Jul. 1, 2017.

(51) Int. Cl.
*B60W 30/16* (2020.01)
*B60W 30/14* (2006.01)

(52) U.S. Cl.
CPC .......... *B60W 30/16* (2013.01); *B60W 30/143* (2013.01); *B60W 2420/52* (2013.01);
(Continued)

(58) Field of Classification Search
CPC ............... B60W 30/16; B60W 30/143; B60W 2420/52; B60W 2520/10
See application file for complete search history.

(56) References Cited

U.S. PATENT DOCUMENTS 6,370,475 B1 * 4/2002 Breed ................. B60N 2/2863
340/436
6,777,904 B1    8/2004 Degner
(Continued)

FOREIGN PATENT DOCUMENTS

EP    1754179 A1    2/2007
EP    2448251 A2    5/2012
(Continued)

OTHER PUBLICATIONS

Hou, Xiaodi and Yuille, Alan and Koch, Christof, "A Meta-Theory of Boundary Detection Benchmarks", arXiv preprint arXiv:1302.5985, 2013, 4 pages.
(Continued)

*Primary Examiner* — Behrang Badii
*Assistant Examiner* — Daniel L Greene
(74) *Attorney, Agent, or Firm* — Paul Liu; Jim Salter

(57) ABSTRACT

A system and method for adaptive cruise control with proximate vehicle detection are disclosed. The example embodiment can be configured for: receiving input object data from a subsystem of a host vehicle, the input object data including distance data and velocity data relative to detected target vehicles; detecting the presence of any target vehicles within a sensitive zone in front of the host vehicle, to the left of the host vehicle, and to the right of the host vehicle; determining a relative speed and a separation distance between each of the detected target vehicles relative to the host vehicle; and generating a velocity command to adjust a speed of the host vehicle based on the relative speeds and separation distances between the host vehicle and the detected target vehicles to maintain a safe separation between the host vehicle and the target vehicles.

20 Claims, 14 Drawing Sheets

(52) U.S. Cl.
CPC ... *B60W 2520/10* (2013.01); *B60W 2554/801* (2020.02); *B60W 2554/804* (2020.02); *B60W 2720/10* (2013.01); *B60W 2754/30* (2020.02)

(56) References Cited

U.S. PATENT DOCUMENTS

| | | | |
|---|---|---|---|
| 6,972,709 B1 * | 12/2005 | Deem | G01S 7/35 |
| | | | 342/175 |
| 7,103,460 B1 | 9/2006 | Breed | |
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,218,316 B2 * | 12/2015 | Bernstein | A63H 30/04 |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 2006/0100775 A1 * | 5/2006 | Michi | B60K 31/0008 |
| | | | 701/400 |
| 2007/0230792 A1 | 10/2007 | Shashua | |
| 2008/0249667 A1 | 10/2008 | Horvitz | |
| 2009/0040054 A1 | 2/2009 | Wang | |
| 2010/0049397 A1 | 2/2010 | Lin | |
| 2010/0226564 A1 | 9/2010 | Marchesotti | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0193154 A1 * | 8/2012 | Wellborn | B62D 59/04 |
| | | | 180/14.2 |
| 2012/0274629 A1 | 11/2012 | Baek | |
| 2014/0145516 A1 | 5/2014 | Hirosawa | |
| 2014/0198184 A1 | 7/2014 | Stein | |
| 2015/0062304 A1 | 3/2015 | Stein | |
| 2015/0353082 A1 | 12/2015 | Lee | |
| 2016/0037064 A1 | 2/2016 | Stein | |
| 2016/0094774 A1 | 3/2016 | Li | |
| 2016/0129907 A1 | 5/2016 | Kim | |
| 2016/0146618 A1 * | 5/2016 | Caveney | G05D 1/06 |
| | | | 701/25 |
| 2016/0165157 A1 | 6/2016 | Stein | |
| 2016/0210528 A1 | 7/2016 | Duan | |
| 2016/0321381 A1 | 11/2016 | English | |
| 2016/0375907 A1 | 12/2016 | Erban | |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125002 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017, 10 pages.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transac-

(56) References Cited

OTHER PUBLICATIONS tions on Pattern Analysis and Machine Intelligence, vol. 34, No. 1, pp. 194-201, 2012.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, pp. 1-4, Feb. 25, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.
Li, Yanghao and Wang, Naiyan and Liu, Jiaying and Hou, Xiaodi, "Demystifying Neural Style Transfer", arXiv preprint arXiv:1701.01036, pp. 1-8, Jan. 4, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.
Li, Yanghao and Wang, Naiyan and Liu, Jiaying and Hou, Xiaodi, "Factorized Bilinear Models for Image Recognition", arXiv preprint arXiv:1611.05709, pp. 1-9, Nov. 17, 2016.
Hou, Xiaodi, "Computational Modeling and Psychophysics in Low and Mid-Level Vision", California Institute of Technology, pp. i to xi and 1-114, May 7, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 13-23, Jan. 1, 2001.
Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV], pp. 1-8, Dec. 20, 2016.
Schroff, Florian, Dmitry Kalenichenko, James Philbin, (Google), "FaceNet: A Unified Embedding for Face Recognition and Clustering", pp. 1-10, CVPR Jun. 17, 2015.
Dai, Jifeng, Kaiming He, Jian Sun, (Microsoft Research), "Instance-aware Semantic Segmentation via Multi-task Network Cascades", pp. 1-10, CVPR Dec. 14, 2015.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO], pp. 1-7, Apr. 17, 2015.
Tian Li, "Proposal Free Instance Segmentation Based on Instance-aware Metric", Department of Computer Science, Cranberry-Lemon University, Pittsburgh, PA., pp. 1-2, 2015.
Mohammad Norouzi, David J. Fleet, Ruslan Salakhutdinov, "Hamming Distance Metric Learning", Departments of Computer Science and Statistics, University of Toronto, pp. 1-9, 2012.
Jain, Suyong Dull, Grauman, Kristen, "Active Image Segmentation Propagation", In Proceedings of the IEEE Conference on Computer Vision and Pattern Recognition (CVPR), pp. 1-10, Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.
Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, pp. 512-517, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, pp. 1-9, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.
P. Guarnieri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, pp. 298-312, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, pp. 1-11, 2016.
Adhiraj Somani, Nan Ye, David Hsu, and Wee Sun Lee, "DESPOT: Online POMDP Planning with Regularization", Department of Computer Science, National University of Singapore, pp. 1-9, 2013.
Adam Paszke, Abhishek Chaurasia, Sangpil Kim, and Eugenio Culurciello. Enet: A deep neural network architecture for real-time semantic segmentation. CoRR, abs/1606.02147, pp. 1-10, 2016.
Szeliski, Richard, "Computer Vision: Algorithms and Applications" http://szeliski.org/Book/, pp. i to xxii and 1-957, 2010.

* cited by examiner

SYSTEM AND METHOD FOR ADAPTIVE CRUISE CONTROL WITH PROXIMATE VEHICLE DETECTION

PRIORITY PATENT APPLICATION

This is a continuation-in-part (CIP) patent application drawing priority from U.S. non-provisional patent application Ser. No. 15/640,516; filed Jul. 1, 2017. This present non-provisional CIP patent application draws priority from the referenced patent application. The entire disclosure of the referenced patent application is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for vehicle control systems, cruise control systems, and autonomous driving systems, and more particularly, but not by way of limitation, to a system and method for adaptive cruise control with proximate vehicle detection.

BACKGROUND

An autonomous vehicle is often configured to follow a trajectory based on a computed driving path. However, when variables such as obstacles are present on the driving path, the autonomous vehicle must perform control operations so that the controlled vehicle may be safely driven by changing the speed or the driving path to avoid the obstacles. In many cases, data from cameras can be used to detect obstacles (e.g. other vehicles) in the path. In other cases, radar or LIDAR data can be used. LIDAR is a surveying method that measures distance to a target by illuminating that target with a pulsed laser light and measuring the reflected pulses with a sensor. Differences in laser return times and wavelengths can then be used to make digital representations of the target.

Such a vehicle-mounted radar or LIDAR apparatus can be used with automatic cruise control systems, which operate to detect a lead vehicle (e.g., a vehicle positioned ahead and in the same lane as the controlled vehicle). Conventional cruise control systems are configured to cause the controlled vehicle to maintain a constant speed or a speed that keeps constant the following distance to the lead vehicle. However, traditional cruise control systems that only consider the speed of the controlled vehicle or the distance between the lead vehicle and the following vehicle might fail to react quickly enough to changes in the operation of the lead vehicle, thereby causing an unsafe separation between the two vehicles. Additionally, traditional cruise control systems fail to detect and consider the actions of other vehicles in the proximity of the controlled vehicle.

SUMMARY

A system and method for adaptive cruise control with proximate vehicle detection are disclosed herein. Specifically, the present disclosure relates to an adaptive cruise control (ACC) system and method that allows a host vehicle (e.g., an autonomous or controlled vehicle) to autonomously and safely perform cruise control operations with proximate vehicles positioned in front of or to either side of the host vehicle. In an example embodiment, both the relative separation distance and the relative velocity between the vehicles are taken into account in order to calculate and control the host vehicle's desired velocity and heading at each time step. In contrast to conventional vehicle cruise control systems, the example embodiments are configured to detect and determine a speed, separation distance, and heading of other vehicles in the proximity of the host vehicle for better adaptive cruise control.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
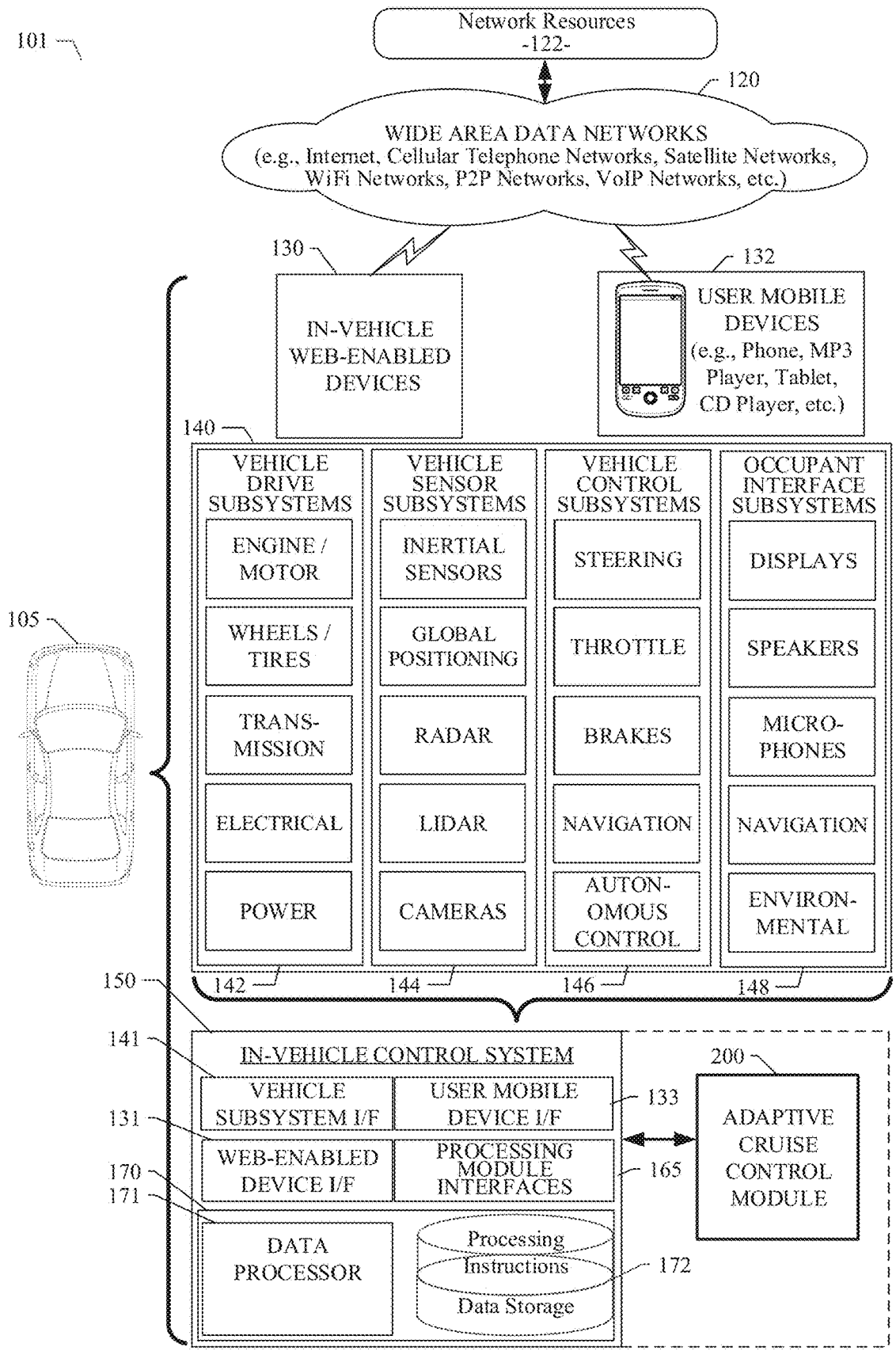
FIG. 1 illustrates a block diagram of an example ecosystem in which an adaptive cruise control module of an example embodiment can be implemented.

As described in various example embodiments, a system and method for adaptive cruise control with proximate vehicle detection are described herein. An example embodiment disclosed herein can be used in the context of an in-vehicle control system 150 in a vehicle ecosystem 101 as shown in FIG. 1. In one example embodiment, an in-vehicle control system 150 with an adaptive cruise control module 200 resident in a vehicle 105 can be configured like the architecture and ecosystem 101 illustrated in FIG. 1. However, it will be apparent to those of ordinary skill in the art that the adaptive cruise control module 200 described and claimed herein can be implemented, configured, and used in a variety of other applications and systems as well.

Referring now to FIG. 1, a block diagram illustrates an example ecosystem 101 in which an in-vehicle control system 150 and an adaptive cruise control module 200 of an example embodiment can be implemented. These components are described in more detail below. Ecosystem 101 includes a variety of systems and components that can generate and/or deliver one or more sources of information/data and related services to the in-vehicle control system 150 and the adaptive cruise control module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and an image processing module executing therein can receive this image and timing data input. The image processing module can extract object data from the image and timing data to identify objects in the proximity of the vehicle 105. Additionally, a LIDAR sensor installed in the vehicle 105, as another one of the devices of vehicle subsystems 140, can generate distance data as point clouds that can be received by the in-vehicle control system 150. The in-vehicle control system 150 and a LIDAR data processing module executing therein can receive this distance data and point cloud input. The LIDAR data processing module can generate distance data relative to objects detected in the proximity of the vehicle 105. The in-vehicle control system 150 can process the object image data and object distance data of detected objects to generate a position and velocity for each proximate object near the autonomous vehicle 105. As described in more detail below, the adaptive cruise control module 200 can use the position and velocity for each proximate object to manage the speed and distance of the vehicle 105 relative to a lead vehicle (e.g., a detected proximate object). Vehicle control or command signals generated by the adaptive cruise control module 200 can be used by an autonomous vehicle control subsystem, as another one of the subsystems of vehicle subsystems 140, to maintain the vehicle 105 at a speed and on a path that does not intersect with the paths of the proximate objects, including the lead vehicle. The autonomous vehicle control subsystem, for example, can use the vehicle control or command signals to safely and efficiently control and navigate the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the adaptive cruise control module 200 for processing vehicle distance and velocity data received from one or more of the vehicle subsystems 140. The data processor 171 can be combined with a data storage device 172 as part of a computing system 170 in the in-vehicle control system 150. The data storage device 172 can be used to store data, processing parameters, weight coefficients, and data processing instructions. A processing module interface 165 can be provided to facilitate data communications between the data processor 171 and the adaptive cruise control module 200. In various example embodiments, a plurality of processing modules, configured similarly to adaptive cruise control module 200, can be provided for execution by data processor 171. As shown by the dashed lines in FIG. 1, the adaptive cruise control module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing object input or object input analysis. Antennas can serve to connect the in-vehicle control system 150 and the adaptive cruise control module 200 with the data network 120 via cellular, satellite, radio, or other conventional signal reception mechanisms. Such cellular data networks are currently available (e.g., Verizon™ AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the adaptive cruise control module 200 can receive web-based data or content via an in-vehicle web-enabled device interface 131, which can be used to connect with the in-vehicle web-enabled device receiver 130 and network 120. In this manner, the in-vehicle control system 150 and the adaptive cruise control module 200 can support a variety of network-connectable in-vehicle devices and systems from within a vehicle 105.

As shown in FIG. 1, the in-vehicle control system 150 and the adaptive cruise control module 200 can also receive data, processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, object processing control parameters, and content for the in-vehicle control system 150 and the adaptive cruise control module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geolocation sensors or components in the mobile device, which can be used to determine the real-time geo-location of the user (via the mobile device) at any moment in time. In any case, the in-vehicle control system 150 and the adaptive cruise control module 200 in data communication therewith can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the adaptive cruise control module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels.

For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an $O_2$ monitor, a fuel gauge, an engine oil temperature, etc.). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers or other distance measuring equipment. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the adaptive cruise control module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the adaptive cruise control module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 140, the vehicle sensor subsystem 144, the vehicle control subsystem 146, and the occupant interface subsystems 148.

In addition to the processing instructions, the data storage device 172 may store data such as pre-configured processing parameters, weight coefficients, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 140, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and follow a path or trajectory and speed generated with the assistance of data and commands from the adaptive cruise control module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and adaptive cruise control module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the adaptive cruise control module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the adaptive cruise control module 200 can be implemented as in-vehicle components of vehicle 105. In various example embodiments, the in-vehicle control system 150 and the adaptive cruise control module 200 in data communication therewith can be implemented as integrated components or as separate components. In an example embodiment, the software components of the in-vehicle control system 150 and/or the adaptive cruise control module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Figure 2:
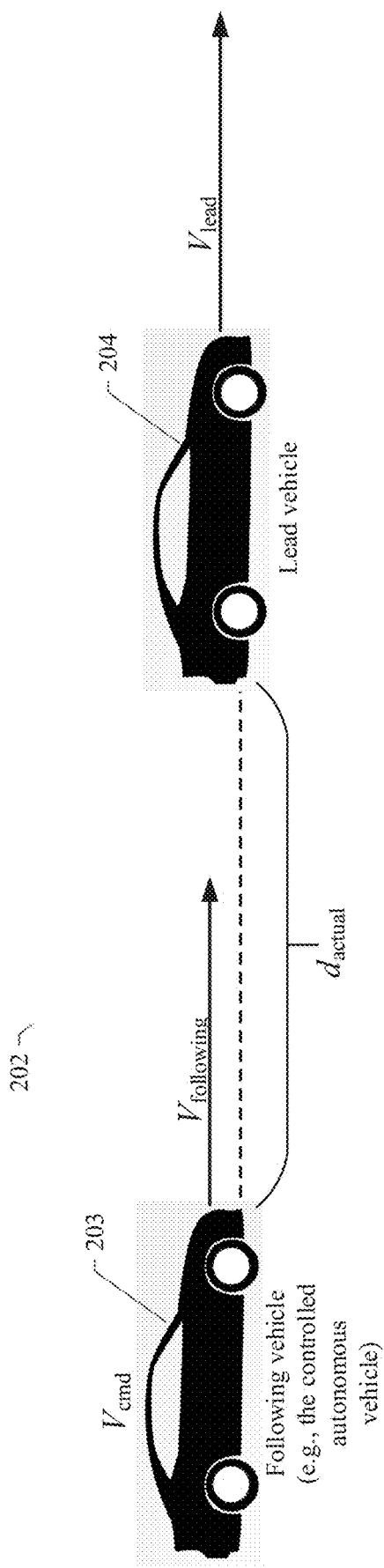
FIG. 2 illustrates an example scenario with two vehicles in a typical configuration where one vehicle leads and another vehicle follows.

Referring now to FIG. 2, a diagram illustrates an example scenario with two vehicles in a typical configuration 202 where one vehicle leads and another vehicle follows. In the example shown, a following vehicle 203 is shown and configured to include the in-vehicle control system 150 as described herein. Another vehicle 204 is positioned in the same lane and in front of the following vehicle 203 and separated by a distance $d_{actual}$. As such, the vehicle 204 is denoted as the lead vehicle. In the example shown, the following vehicle 203 is traveling at a velocity of $V_{following}$. The lead vehicle is traveling at a velocity of $V_{lead}$. The distance $d_{actual}$ between the following vehicle 203 and the lead vehicle 204 can be measured at any point in time using the radar or LIDAR sensors in the following vehicle 203 as described above. Similarly, the velocities $V_{following}$ and $V_{lead}$ can be measured in a similar manner. The challenge with the configuration shown in FIG. 2 is to either maintain a constant or desired distance $d_{actual}$ between the lead vehicle 204 and the following vehicle 203 or to cause the velocity $V_{following}$ of the following vehicle 203 to match the velocity $V_{lead}$ of the lead vehicle 204. Thus, it is important to determine a command velocity $V_{cmd}$ to control the following vehicle 203 to conform to the desired distance or velocity. In this manner, a safe separation between the lead vehicle 204 and the following vehicle 203 can be maintained. As described in more detail below, the relative velocity of the autonomous vehicle 203 and the lead vehicle 204 as controlled by the example embodiment is considered to allow the autonomous vehicle 203 to respond in a way that is similar to human drivers' defensive driving behavior when following a lead vehicle.

Figure 3:
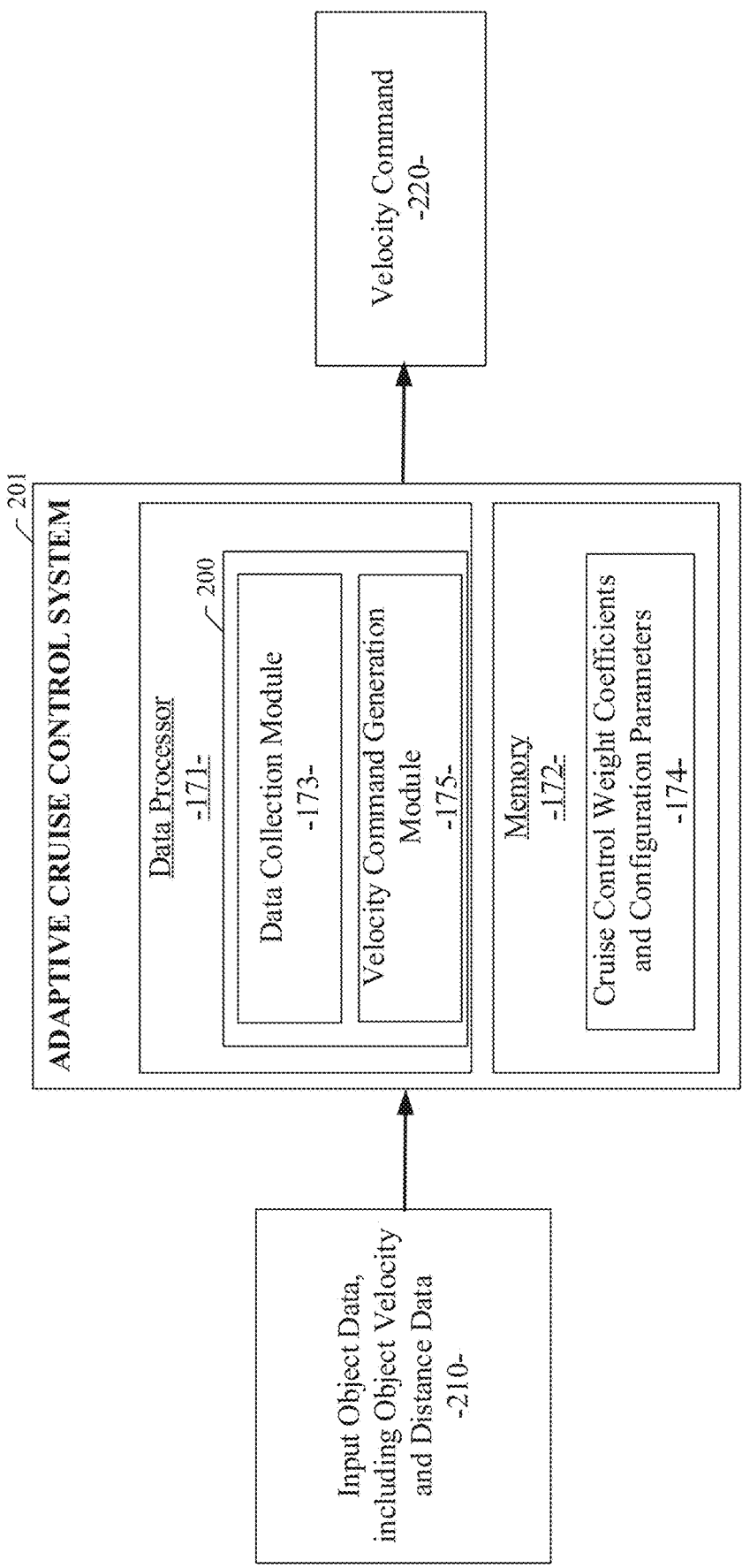
FIGS. 3 and 4 illustrate the components of the adaptive cruise control module of an example embodiment.

Referring now to FIG. 3, a diagram illustrates the components of an adaptive cruise control system 201 with the adaptive cruise control module 200 of an example embodiment. In the example embodiment, the adaptive cruise control module 200 can be configured to include a data collection module 173 and a velocity command generation module 175. As described in more detail below, the data collection module 173 and the velocity command generation module 175 serve to enable generation of a velocity command, $V_{cmd}$, 220, which is the velocity at which a following vehicle (e.g., the controlled autonomous vehicle) is commanded to drive. The input object data 210 can include image data from a camera, which can be processed by an image processing module to identify proximate objects (e.g., moving vehicles, dynamic agents, or other objects in the proximate vicinity of the vehicle 105). The input object data 210 can also include object distance data or point clouds from a LIDAR sensor, which can be processed by a LIDAR data processing module to determine a distance and velocity of each proximate object relative to the vehicle 105. The data collection module 173 and the velocity command generation module 175 can be configured as software modules executed by the data processor 171 of the in-vehicle control system 150. The modules 173 and 175 of the adaptive cruise control module 200 can receive the input object data 210 and produce the velocity command, $V_{cmd}$, 220, which is the velocity at which a following vehicle is commanded to drive, based on the distance and velocity of each proximate object from the input object data 210. The velocity command, $V_{cmd}$, 220 can be used by the autonomous control subsystem of the vehicle control subsystem 146 to more efficiently and safely control the vehicle 105. As part of the generation of the velocity command, $V_{cmd}$, 220, the data collection module 173 and the velocity command generation module 175 can be configured to work with cruise control weight coefficients and configuration parameters 174, which can be used to customize and fine tune the operation of the adaptive cruise control module 200. The cruise control weight coefficients and configuration parameters 174 can be stored in a memory 172 of the in-vehicle control system 150.

In the example embodiment, the adaptive cruise control module 200 can be configured to include an interface with the in-vehicle control system 150, as shown in FIG. 1, through which the adaptive cruise control module 200 can send and receive data as described herein. Additionally, the adaptive cruise control module 200 can be configured to include an interface with the in-vehicle control system 150 and/or other ecosystem 101 subsystems through which the adaptive cruise control module 200 can receive ancillary data from the various data sources described above. As described above, the adaptive cruise control module 200 can also be implemented in systems and platforms that are not deployed in a vehicle and not necessarily used in or with a vehicle.

In an example embodiment as shown in FIG. 3, the adaptive cruise control module 200 can be configured to include the data collection module 173 and the velocity command generation module 175, as well as other processing modules not shown for clarity. Each of these modules can be implemented as software, firmware, or other logic components executing or activated within an executable environment of the adaptive cruise control module 200 operating within or in data communication with the in-vehicle control system 150. Each of these modules of an example embodiment is described in more detail below in connection with the figures provided herein.

System and Method for Adaptive Cruise Control for Defensive Driving

A system and method for adaptive cruise control for low speed following is disclosed herein. Specifically, the example embodiments described herein relate to an adaptive cruise control system and method that allows a controlled vehicle to autonomously and safely follow behind a lead vehicle positioned in front of the autonomous vehicle. In an example embodiment, both the relative distance and relative velocity between the two vehicles are taken into account in order to calculate and control the autonomous vehicle's desired distance or velocity at each time step. In an example embodiment, the velocity command generation module 175 can use the following expression to generate the velocity command, $V_{cmd}$, 220:

$$V_{cmd} = V_{lead} + W_1(d_{actual} - d_{desired}) + W_2(V_{lead} - V_{following})$$

Where:

$V_{cmd}$ is the velocity at which the following vehicle (e.g., the controlled autonomous vehicle) is commanded to drive;

$V_{lead}$ is the measured velocity of the lead vehicle positioned in front of the following vehicle (e.g., in front of the controlled autonomous vehicle);

$W_1$ is a weight coefficient for configuring the significance of the distance differential;

$d_{actual}$ is the actual measured distance between the lead vehicle and the following vehicle at any point in time;

$d_{desired}$ is the desired distance to maintain between the lead vehicle and the following vehicle;

$W_2$ is a weight coefficient for configuring the significance of the velocity differential; and $V_{following}$ is the velocity of the following vehicle (e.g., the controlled autonomous vehicle).

In an example embodiment, the adaptive cruise control module 200 can be configured to use the data collection module 173 and the velocity command generation module 175 to generate the velocity command, $V_{cmd}$, 220, which is the velocity at which a following vehicle (e.g., the controlled autonomous vehicle) is commanded to drive to maintain a desired distance or velocity. The usage of the expression described above by the velocity command generation module 175 is described in more detail in connection with FIG. 4.

Figure 4:
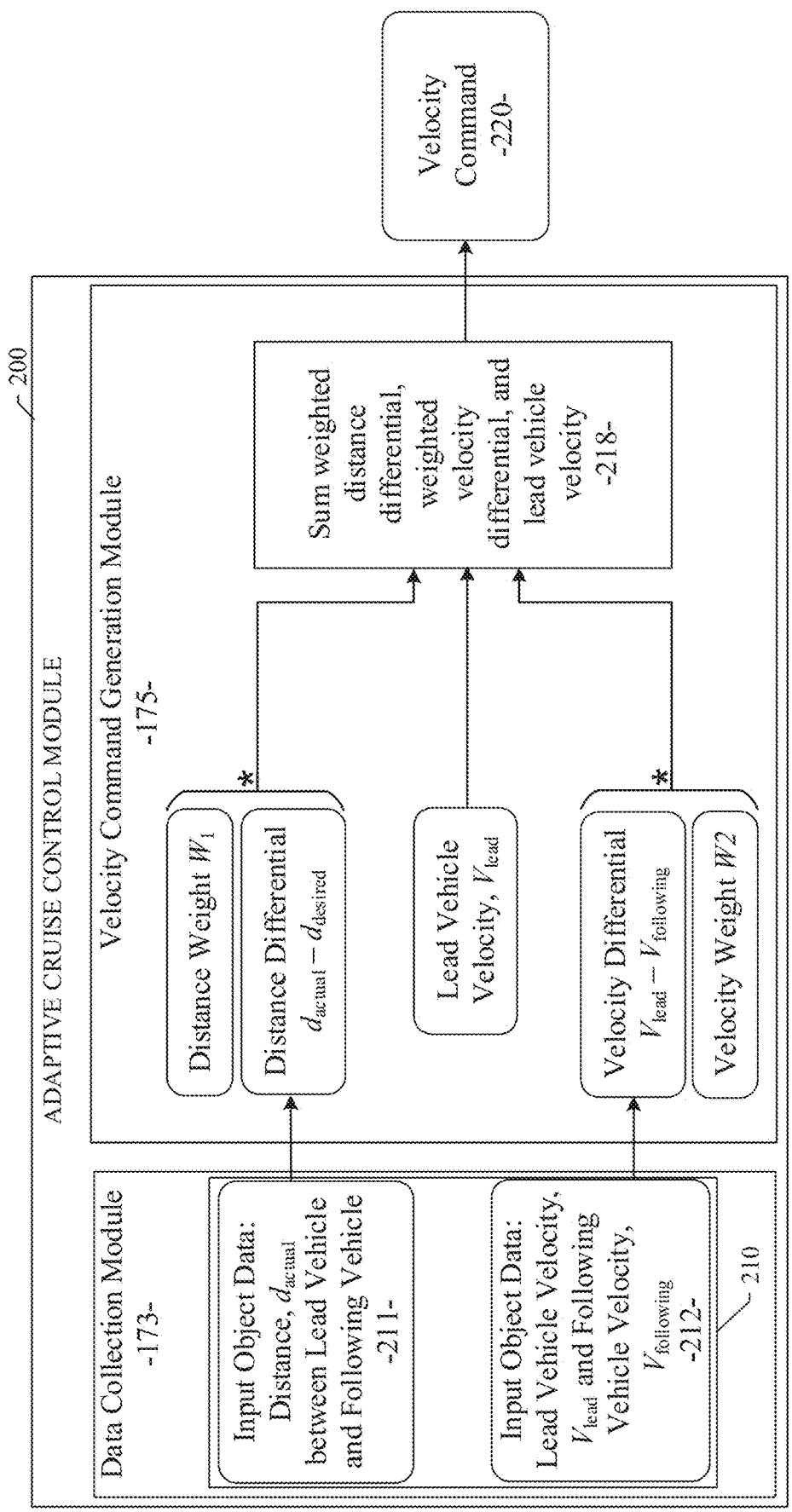

FIG. 4 illustrates the components of the adaptive cruise control module 200 of an example embodiment. As shown, the adaptive cruise control module 200 can be configured to include a data collection module 173 and a velocity command generation module 175. The adaptive cruise control module 200, and the data collection module 173 therein, can receive input object data 210 from one or more of the vehicle sensor subsystems 144, including one or more cameras and one or more LIDAR sensors. The input object data 210 can include image data from a video stream generated by an image generating device, such as a camera. The input object data 210 can also include distance data from a distance measuring device, such as a LIDAR sensor device. The image data from the input object data 210 can be processed by an image data processing module to identify proximate vehicles or other objects (e.g., moving vehicles, dynamic agents, or other objects in the proximate vicinity of the vehicle 105). For example, a process of semantic segmentation and/or object detection can be used to process the image data and identify objects in the images. The input object data 210 can include distance data from the distance measuring device, such as a LIDAR sensor device. The distance data can be represented as point clouds from the LIDAR. The distance data can be used to measure the distances from the vehicle 105 to each of the potential proximate objects with a high degree of precision. The distance data can also be used to measure the velocities of the proximate objects relative to the vehicle 105. The data related to the identified objects and corresponding distance and velocity measurements can be received by the data collection module 173. In particular, the data collection module 173 can receive data corresponding to the distance, $d_{actual}$ 211 between a lead vehicle 204 and a following vehicle 203. The data collection module 173 can also receive data corresponding to the lead vehicle 204 velocity $V_{lead}$ and the following vehicle 203 velocity $V_{following}$ 212.

Referring still to FIG. 4, the velocity command generation module 175 can receive the distance data 211 and velocity data 212 from the data collection module 173. The velocity command generation module 175 can be pre-configured with a parameter $d_{desired}$, which represents the desired distance that should be maintained between the lead vehicle 204 and the following vehicle 203. The parameter $d_{desired}$ can be a user-configurable parameter. The velocity command generation module 175 can also be pre-configured with cruise control weight coefficients $W_1$ and $W_2$. $W_1$ is a user-configurable weight coefficient for configuring the significance of the distance differential between the actual distance $d_{actual}$ and a desired distance $d_{desired}$. $W_2$ is a user-configurable weight coefficient for configuring the significance of the velocity differential between the velocity $V_{lead}$ of the lead vehicle 204 and the velocity $V_{following}$ of the following vehicle 203.

As shown in FIG. 4, the velocity command generation module 175 can compute the product of the distance weight coefficient $W_1$ and the distance differential between the actual distance $d_{actual}$ and a desired distance $d_{desired}$ between the following vehicle 203 and the lead vehicle 204. The velocity command generation module 175 can also compute the product of the velocity weight coefficient $W_2$ and the velocity differential between the velocity $V_{lead}$ of the lead vehicle 204 and the velocity $V_{following}$ of the following vehicle 203. These products are combined or summed with the lead vehicle velocity $V_{lead}$ in block 218. As a result of the computation in block 218, the velocity command generation module 175 can generate data indicative of a velocity command, $V_{cmd}$, 220, which is the velocity at which the following vehicle 203 (e.g., the controlled autonomous vehicle) is commanded to drive to maintain a desired distance or velocity relative to the lead vehicle 204. The velocity command, $V_{cmd}$, 220 can be used by the in-vehicle control system 150 to control the speed of the autonomous vehicle to conform with the speed corresponding to the velocity command.

System and Method for Adaptive Cruise Control for Low Speed Following

Figure 5:
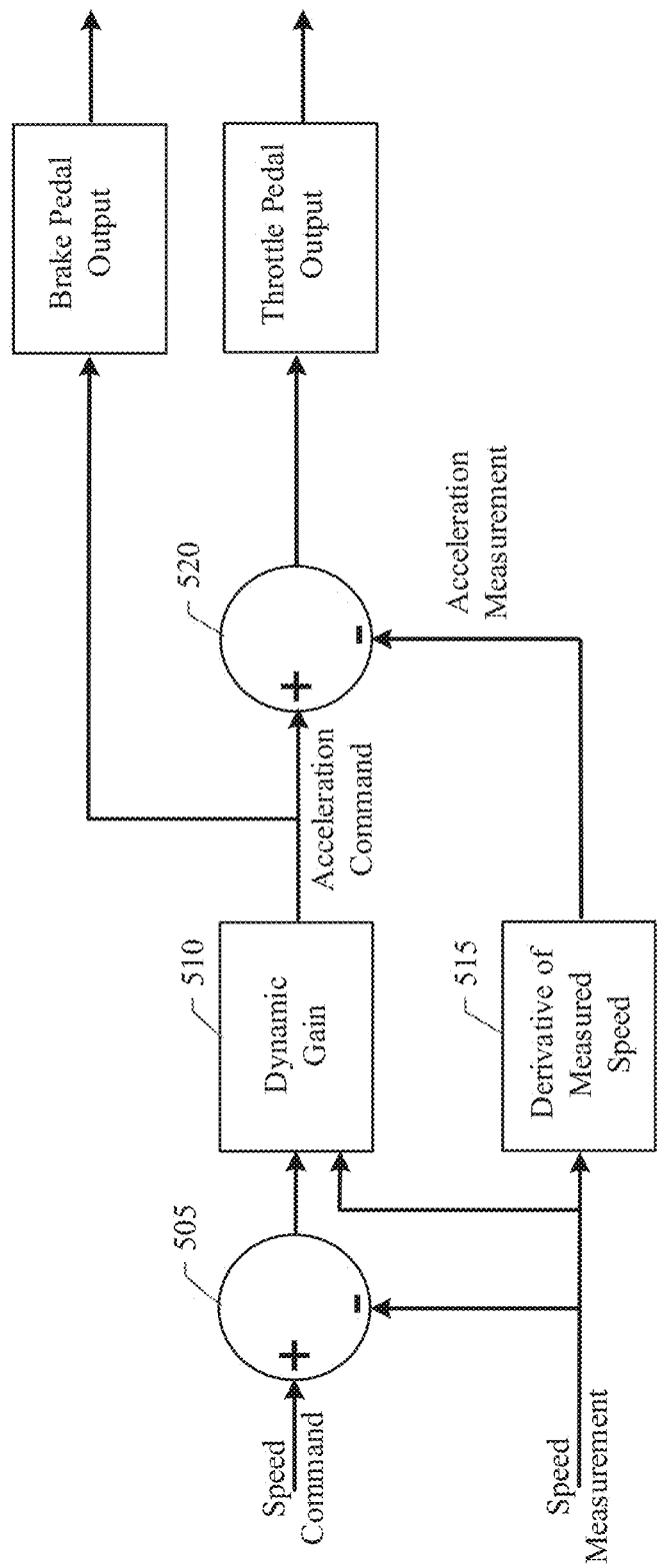
FIG. 5 illustrates the components of a control mechanism for low speed following for the adaptive cruise control module of an example embodiment.

FIG. 5 illustrates the components of a control mechanism for low speed following for the adaptive cruise control module of an example embodiment. In the example embodiment shown in FIG. 5, a speed or velocity command can be generated by the adaptive cruise control module 200 or other control mechanisms of the autonomous vehicle 105. The speed command represents the desired speed at which the autonomous vehicle 105 should be traveling. The various vehicle subsystems 140, as described above, can measure or determine the actual measured speed of the vehicle using one or more sensor systems. The speed command and the measured speed can be provided as inputs to a difference engine 505. The difference engine 505 can provide as an output a value or signal corresponding to the difference between the speed command and the measured speed. This difference or speed error can be provided as an input to a dynamic gain module 510. In a particular embodiment, a measured speed can also be provided as an input to the dynamic gain module 510. The details of the processing performed by the dynamic gain module 510 are described below.

In an example embodiment, the measured speed can also be provided as an input to a speed derivative module 515. The speed derivative module 515 can compute a derivative of the measured speed using conventional techniques to produce a measured acceleration. The measured acceleration can be provided as an input to a difference engine 520. The difference engine 520 can provide as an output a value or signal corresponding to the difference between an acceleration command and the measured acceleration. This difference or acceleration error can be provided as an input to a throttle pedal control module, which can control the operation of the vehicle's throttle to achieve the desired speed. The acceleration command can also be provided as an input to a brake pedal control module, which can control the operation of the vehicle's braking system.

Referring again to the dynamic gain module 510, an example embodiment provides a dynamic and variable gain mechanism, which is applied to the speed error output from the difference engine 505 to produce the acceleration command. In contrast to conventional control systems that use a constant or fixed gain, the example embodiments disclosed herein provide a dynamic and variable gain, which is applied to produce the acceleration command. As a result, the dynamic gain produced by the dynamic gain module 510 provides a more responsive control system under a wide variety of vehicle operating conditions, including speed. For example, a conventional fixed gain control system may be configured to work well at typical vehicle high cruise speeds. However, these fixed gain control systems are either under-responsive or overly-responsive at slow speeds. As a result, conventional cruise control systems do not operate efficiently at slow speeds, such as the conditions encountered in a traffic jam. In response to this problem, the example embodiments described herein provide the dynamic gain module 510, which provides a dynamic and variable gain to appropriately adjust the acceleration command for all vehicle speed ranges. In a particular embodiment, the measured speed can be provided as an input to the dynamic gain module 510. The dynamic gain module 510 can adjust the output dynamic gain as a function of the measured speed. In other alternative embodiment, other inputs can be provided to the dynamic gain module 510. For example, the speed command value, the measured acceleration, or other dynamic inputs can be provided to the dynamic gain module 510. These inputs can be used by the dynamic gain module 510 to dynamically adjust the output dynamic gain as a function of these inputs. As a result, the dynamic gain provided by the dynamic gain module 510 can enable the cruise control systems as described herein to operate efficiently, even at slow speeds, such as the conditions encountered in a traffic jam or low speed following.

Figure 6:
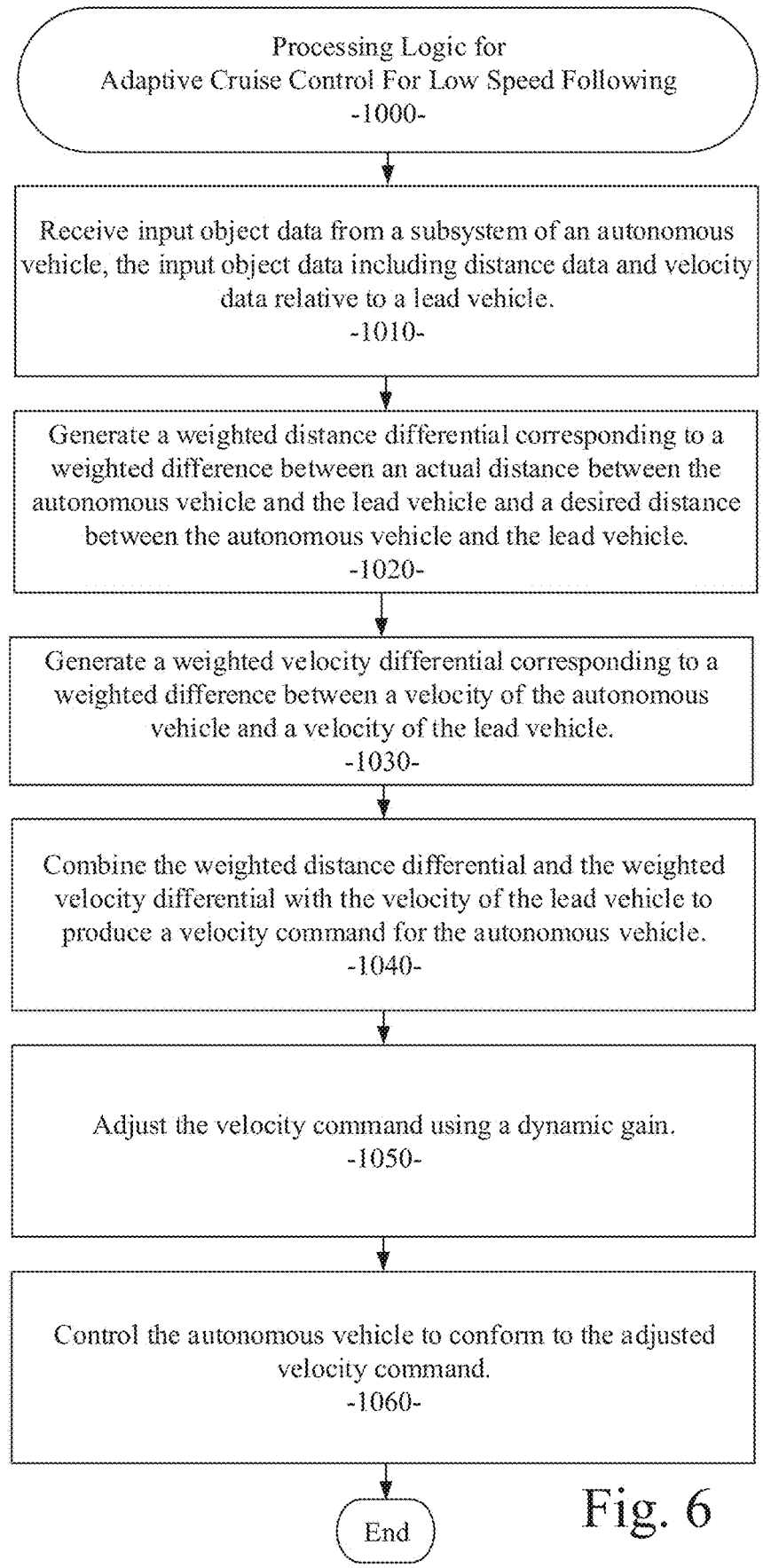
FIG. 6 is a process flow diagram illustrating an example embodiment of a method for adaptive cruise control for low speed following.

Referring now to FIG. 6, a flow diagram illustrates an example embodiment of a system and method 1000 for adaptive cruise control for low speed following. The example embodiment can be configured for: receiving input object data from a subsystem of an autonomous vehicle, the input object data including distance data and velocity data relative to a lead vehicle (processing block 1010); generating a weighted distance differential corresponding to a weighted difference between an actual distance between the autonomous vehicle and the lead vehicle and a desired distance between the autonomous vehicle and the lead vehicle (processing block 1020); generating a weighted velocity differential corresponding to a weighted difference between a velocity of the autonomous vehicle and a velocity of the lead vehicle (processing block 1030); combining the weighted distance differential and the weighted velocity differential with the velocity of the lead vehicle to produce a velocity command for the autonomous vehicle (processing block 1040); adjusting the velocity command using a dynamic gain (processing block 1050); and controlling the autonomous vehicle to conform to the adjusted velocity command (processing block 1060).

System and Method for Adaptive Cruise Control with Proximate Vehicle Detection

A system and method for adaptive cruise control with proximate vehicle detection are disclosed herein. Specifically, the present disclosure relates to an adaptive cruise control (ACC) system and method that allows a host vehicle (e.g., an autonomous or controlled vehicle) to autonomously and safely perform cruise control operations with proximate vehicles positioned in front of or to either side of the host vehicle. In an example embodiment, both the relative separation distance and the relative velocity between the vehicles are taken into account in order to calculate and control the host vehicle's desired velocity and heading at each time step. In contrast to conventional vehicle cruise control systems, the example embodiments are configured to detect and determine a speed, separation distance, and heading of other vehicles in the proximity of the host vehicle for better adaptive cruise control.

Figure 7:
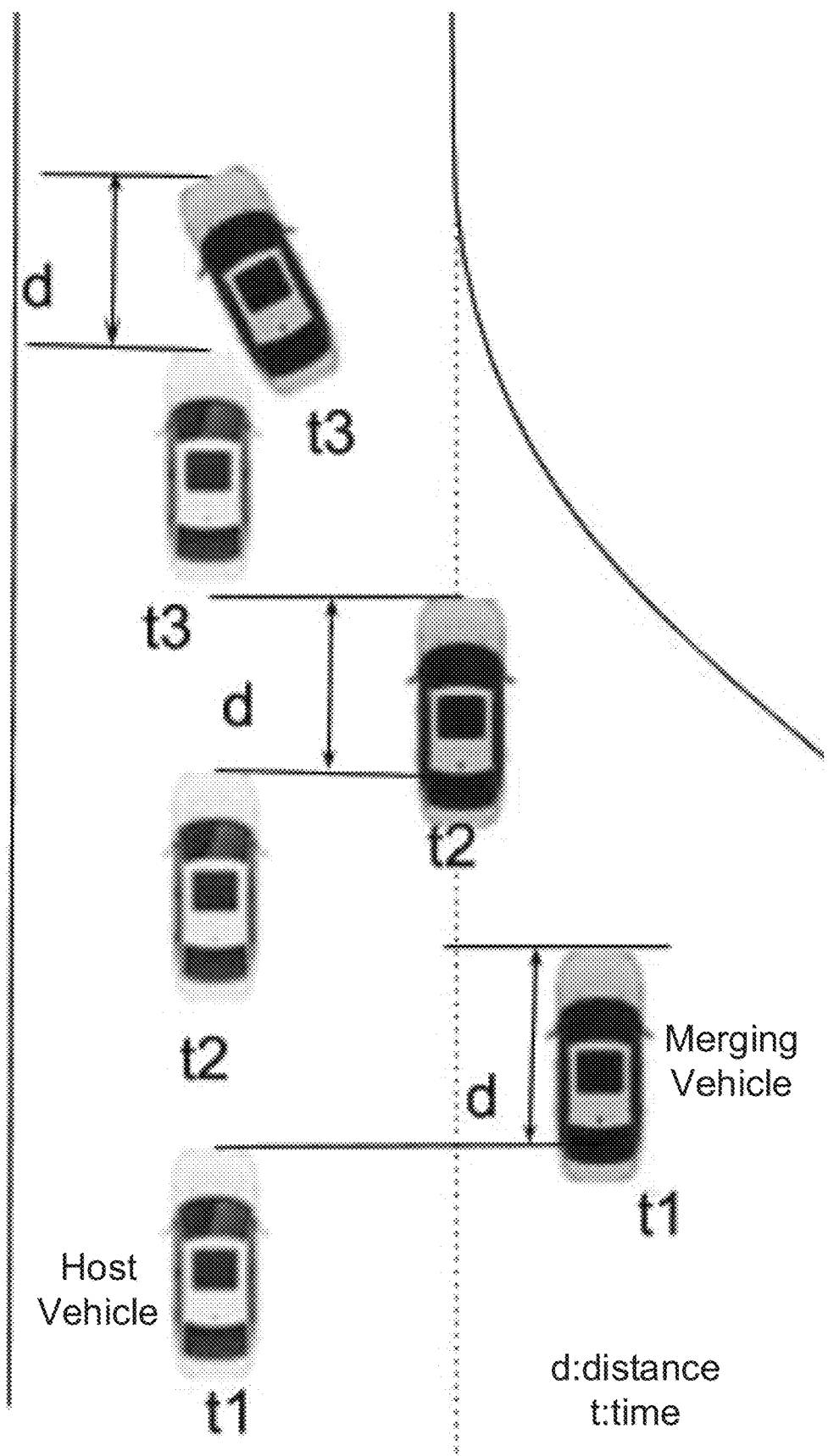
FIG. 7 illustrates a traditional adaptive cruise control (ACC) technology that focuses on the closest front or leading vehicle in the current lane (e.g., the same lane as the host vehicle) as the target vehicle.

Referring now to FIG. 7, traditional adaptive cruise control (ACC) technologies typically focus on the closest front or leading vehicle in the current lane (e.g., the same lane as the host vehicle) as the target vehicle and use an objective function to maintain a separation distance and minimize speed differences with the target vehicle. One challenge for this method as shown in FIG. 7 is when a vehicle (merging vehicle shown in FIG. 7) merges in from a neighboring lane or a highway on-ramp with a lower speed (v) and a shorter separation distance (d) than a safe pre-defined separation distance between the host vehicle and the merging vehicle. In this situation, the host vehicle has limited options to avoid collision. One viable option to avoid collision is to reduce the speed of the host vehicle to avoid the merging vehicle. However, traditional ACC systems will typically not vary the speed of the host vehicle under these conditions, which can cause an unsafe driving situation.

In the various example embodiments described herein, the adaptive cruise control system 201 and the velocity command generation module 175 therein can be configured to detect a plurality of target vehicles in the vicinity of (proximate to) the host vehicle. As described above, The adaptive cruise control module 200, and the data collection module 173 therein, can receive input object data 210 from one or more of the vehicle sensor subsystems 144, including one or more cameras and one or more LIDAR sensors. The input object data 210 can include image data from a video stream generated by an image generating device, such as a camera. The input object data 210 can also include distance data from a distance measuring device, such as a LIDAR sensor device. The image data from the input object data 210 can be processed by an image data processing module to identify proximate vehicles or other objects (e.g., moving vehicles, dynamic agents, or other objects in the proximate vicinity of the vehicle 105). In an example embodiment, these proximate vehicles can be used as target vehicles in the processing performed by the velocity command generation module 175.

Figure 8:
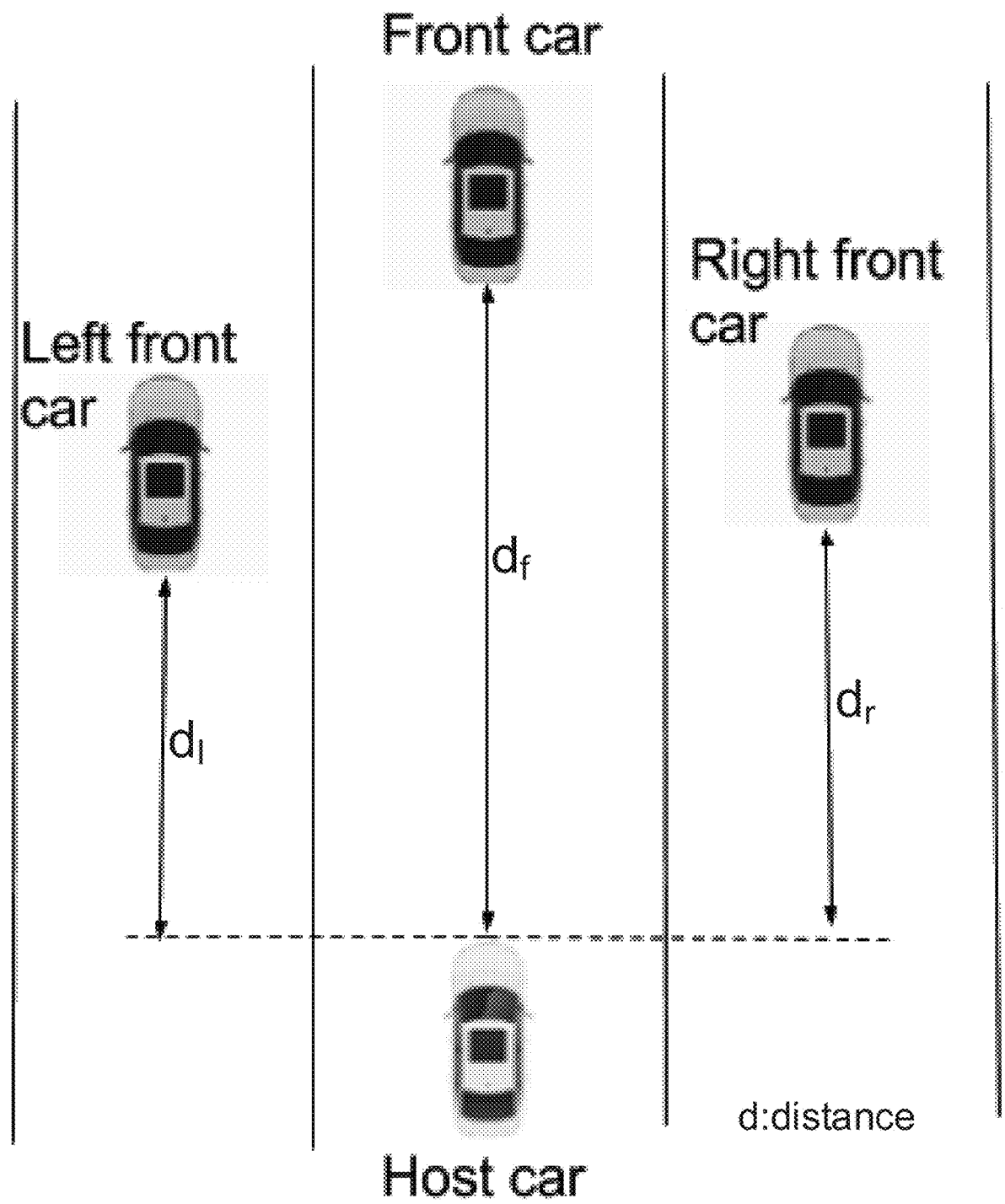
FIG. 8 illustrates an example embodiment that uses three vehicle positions as potential ACC target vehicles: a front or leading vehicle in the same current lane as the host vehicle, and possibly two other proximate vehicles in an ACC sensitive zone in the neighboring lanes on each side of the host vehicle.

Referring now to FIG. 8, an example embodiment can use three vehicle positions as potential ACC target vehicles: a front or leading vehicle in the same current lane as the host vehicle, and possibly two other proximate vehicles in an ACC sensitive zone in the neighboring lanes on each side of the host vehicle. By detecting the target vehicles in the front and to the sides of the host vehicle, the velocity command generation module 175 of the example embodiments can adjust the speed of the host vehicle based on the relative speeds and separation distances between the host vehicle and the target vehicles. As a result, the example embodiments can configure the velocity command generation module 175 to modify the velocity command 220 output from the ACC 201 to cause the host vehicle to maintain a safe speed and separation distance from a target vehicle that may merge into the lane in which the host vehicle is driving. Additionally, the velocity command generation module 175 can be configured to cause the host vehicle to stay out of the blind spots of any proximate vehicles based on the relative speeds and separation distances between the host vehicle and the target vehicles. Thus, the various example embodiments can increase the safety of an autonomous vehicle encountering merging situations with other proximate vehicles.

Referring still to FIG. 8, the host vehicle is shown in proximity with three other target vehicles: a front vehicle with a separation distance $d_f$ from the host vehicle, a left front vehicle with a separation distance $d_l$ from the host vehicle, and a right front vehicle with a separation distance $d_r$ from the host vehicle. Again, as described above, the adaptive cruise control module 200 can detect these proximate vehicles using the input object data 210 and determine the distance, speed, and heading of the proximate vehicles. In the example embodiment, a sensitive zone can be defined as a region around the host vehicle within pre-defined distance thresholds. The pre-defined distance thresholds can be defined separately for the area in front of the host vehicle, the area to the left of the host vehicle, and the area to the right of the host vehicle. Thus, as shown in FIG. 8, a front or leading vehicle that is positioned at a distance that is less than or equal to the pre-defined distance threshold for the area in front of the host vehicle (e.g., $d_f \leq$ the front pre-defined threshold) becomes a target vehicle for consideration by the velocity command generation module 175 as described in more detail below. Similarly, a left front vehicle that is positioned at a distance that is less than or equal to the pre-defined distance threshold for the area to the left of the host vehicle (e.g., $d_l \leq$ the left front pre-defined threshold) also becomes a target vehicle for consideration by the velocity command generation module 175. Finally, as also shown in FIG. 8, a right front vehicle that is positioned at a distance that is less than or equal to the pre-defined distance threshold for the area to the right of the host vehicle (e.g., $d_r \leq$ the right front pre-defined threshold) also becomes a target vehicle for consideration by the velocity command generation module 175. As such, any proximate vehicles detected to be within the sensitive zone of the host vehicle can be target vehicles for consideration by the velocity command generation module 175. In various example embodiments, the front pre-defined threshold, the left front pre-defined threshold, and the right front pre-defined threshold can be the same distance. However, in an example embodiment, the front pre-defined threshold is typically longer or greater than the left front pre-defined threshold and the right front pre-defined threshold to give greater consideration to the leading vehicle in the same lane as the host vehicle. Additionally, the right front pre-defined threshold can be greater than the left front pre-defined threshold to give greater consideration to target vehicles on the right that are more likely to be merging from the right in countries or regions where vehicles drive on the right side of the roadway. Typically, the left and right pre-defined thresholds are configured to be shorter or less than the front pre-defined threshold. It will be apparent to those of ordinary skill in the art in view of the disclosure herein that the front pre-defined threshold, the left front pre-defined threshold, and the right front pre-defined threshold can be appropriately configured for the driving environment in which the ACC 201 will operate.

Figure 9:
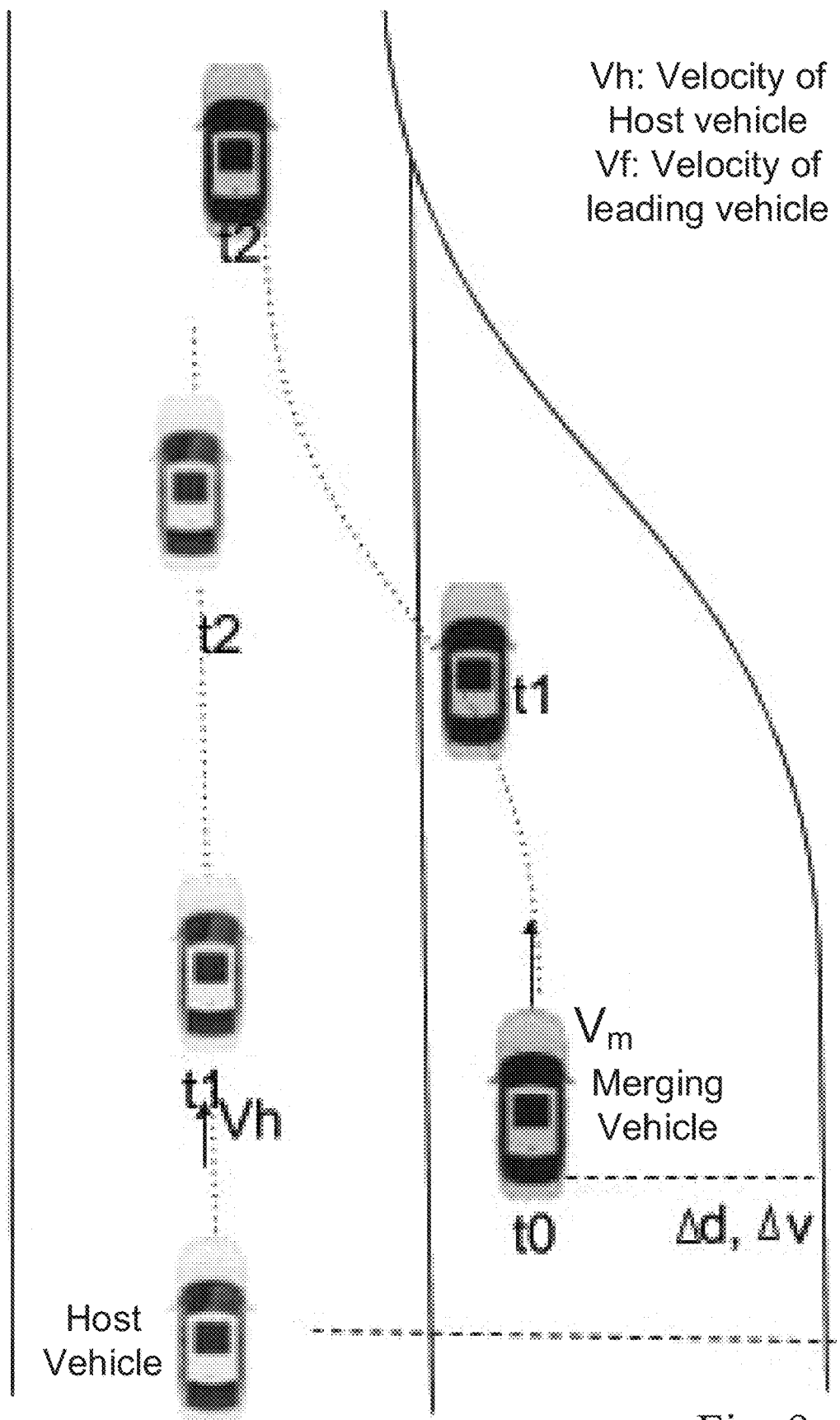
FIG. 9 illustrates an example embodiment that can compute the differentials ($\Delta d$) of the separation distances between the each of the target vehicles and the host vehicle over time and can also compute the differentials ($\Delta v$) of the speeds of the target vehicles relative to the host vehicle over time.

Referring now to FIG. 9, once the velocity command generation module 175 detects the target vehicles in the front and to the sides of the host vehicle as described above, the velocity command generation module 175 of the example embodiments can determine the speed and the separation distance between each of the target vehicles relative to the host vehicle. Additionally, because the speed ($V_h$) and position of the host vehicle can be readily determined from information obtained from the vehicle subsystems 140, the velocity command generation module 175 can compute the differentials ($\Delta d$) of the separation distances between the each of the target vehicles and the host vehicle over time. The velocity command generation module 175 can also compute the differentials ($\Delta v$) of the speeds of the target vehicles relative to the host vehicle over time.

In the example shown in FIG. 8, a target vehicle (merging vehicle) has been detected at time $t_0$ operating at speed $V_m$ in the sensitive zone as within the right front pre-defined threshold relative to the host vehicle operating at speed $V_h$. Given the differential ($\Delta d$) of the separation distance and the differential ($\Delta v$) of the speed $V_m$ of the target vehicle relative to the speed $V_h$ of the host vehicle, the velocity command generation module 175 can compute the predicted position and speed of the target vehicle (merging vehicle) at a future point in time (e.g., $t_1 \ldots t_n$). Because the velocity command generation module 175 can also obtain the speed and position of the host vehicle at any point in time, the velocity command generation module 175 can determine if the predicted position or distance of the target vehicle will encroach within a pre-defined safety boundary around the host vehicle. If the velocity command generation module 175 determines that a target vehicle's predicted position or distance will encroach within the pre-defined safety boundary around the host vehicle, the velocity command generation module 175 can adjust the speed of the host vehicle based on the relative speeds and separation distances between the host vehicle and the target vehicles. As a result, the example embodiments can configure the velocity command generation module 175 to modify the velocity command 220 output from the ACC 201 to cause the host vehicle to adjust its speed to maintain a safe speed and separation distance from any of the detected target vehicles that may merge into the lane in which the host vehicle is driving. Because each of the target vehicles detected to be in proximity to the host vehicle will have different positions (e.g., distances) and may be operating at different speeds relative to the host vehicle, the velocity command generation module 175 can process the different parameters of each target vehicle separately and then generate a recommended speed for the host vehicle that maintains separation from each of the target vehicles.

Figure 10:
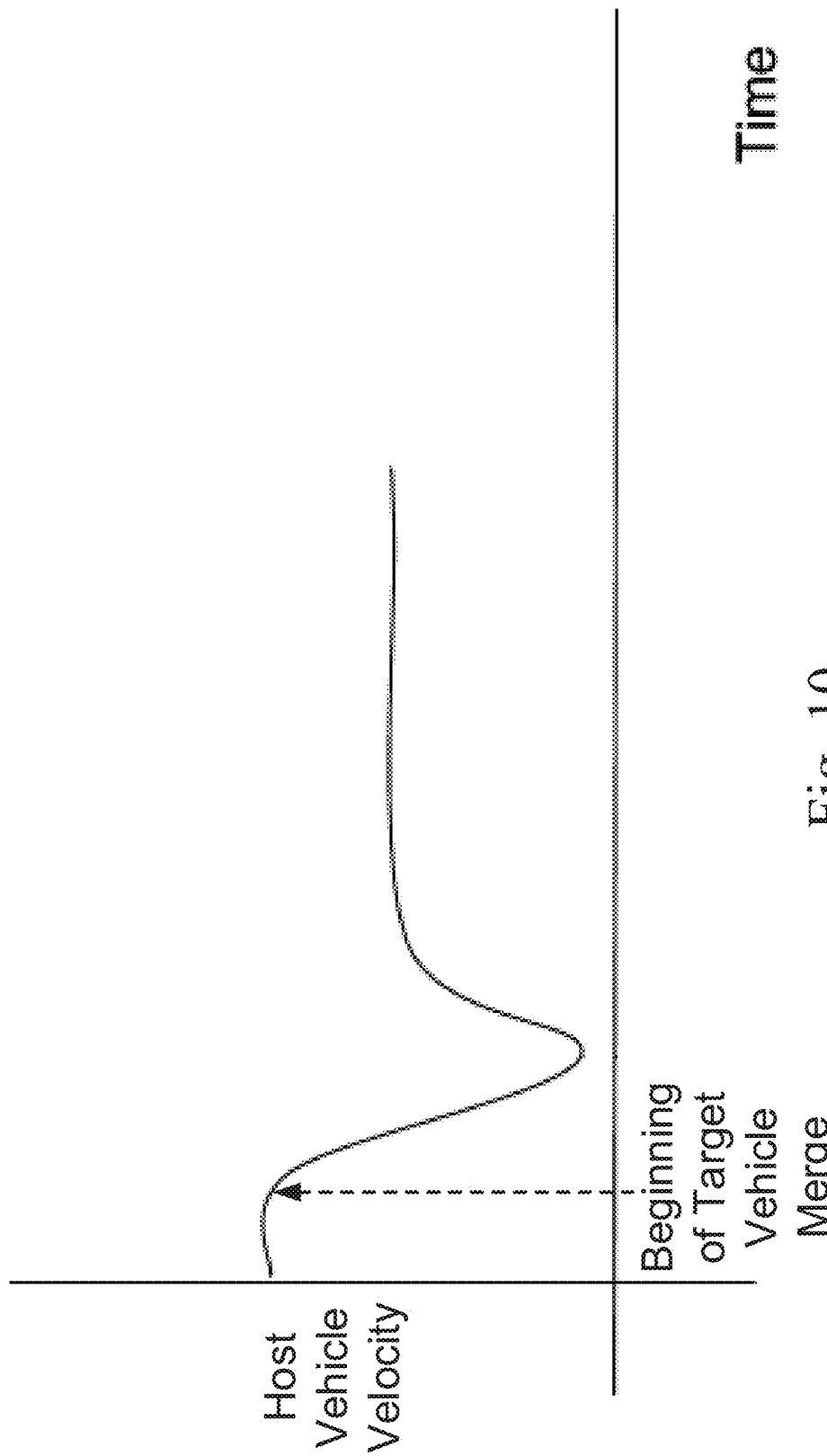
FIGS. 10 and 11 illustrate plots of the host vehicle velocity over time as a target vehicle merges into a lane in which the host vehicle is driving.
Figure 11:
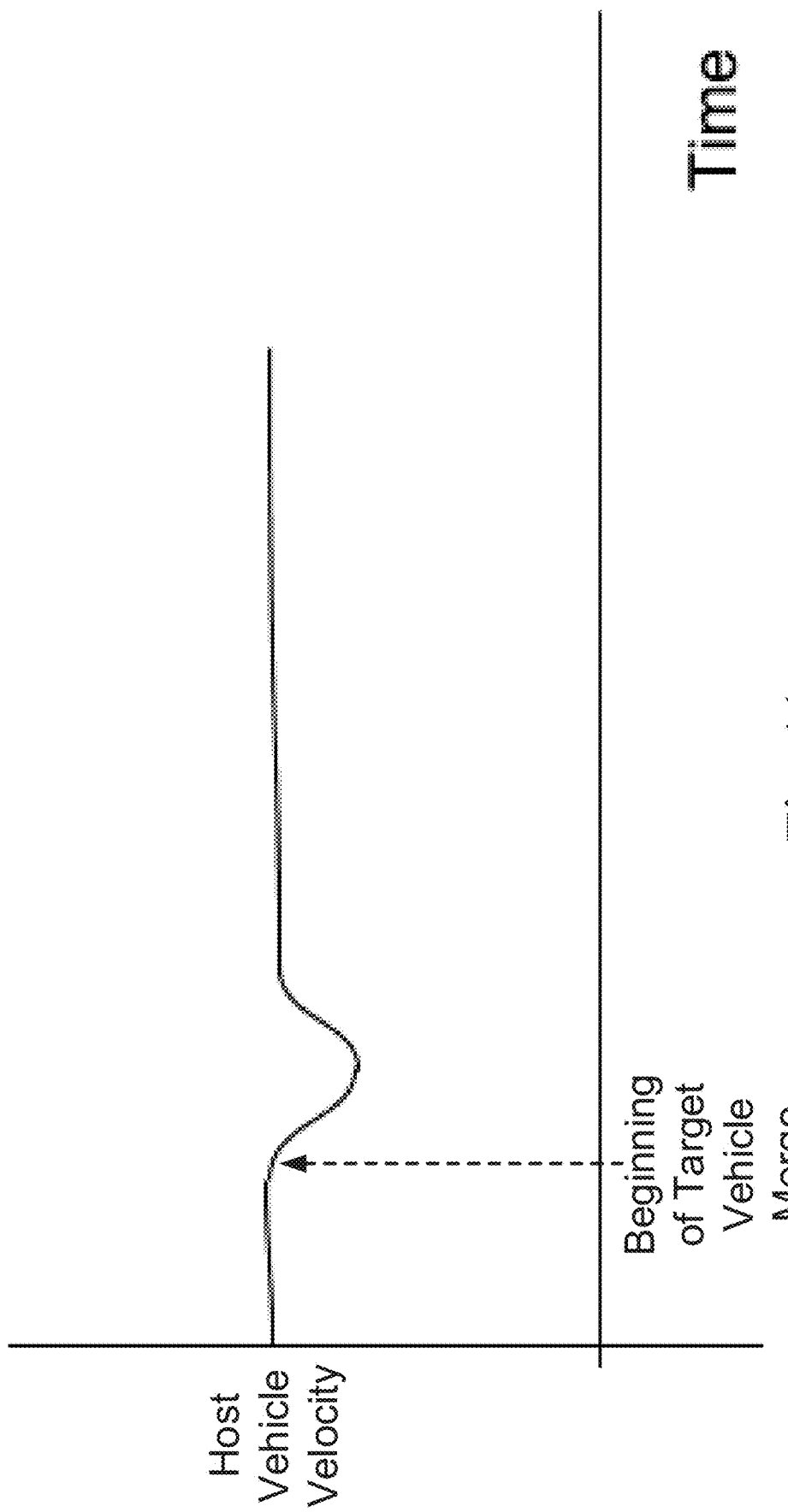

FIGS. 10 and 11 illustrate plots of the host vehicle velocity over time as a target vehicle merges into a lane in which the host vehicle is driving. Using the position (e.g., distance) and speed of the merging target vehicle, the velocity command generation module 175 in the host vehicle can anticipate the merge of the target vehicle at an earlier point and can adjust the speed of the host vehicle more gradually in both amplitude and duration to maintain a safe separation between the host vehicle and the merging target vehicle. FIG. 10 illustrates the results produced by conventional methods using techniques that do not detect proximate merging vehicles. As shown, the velocity of the host vehicle experiences steeper and more abrupt speed variations for a longer period of time as the target vehicle begins to merge into the lane occupied by the host vehicle. In contrast, FIG. 11 illustrates the results produced by the adaptive cruise control techniques disclosed for various example embodiments herein that do detect proximate merging vehicles. As shown, the velocity of the host vehicle experiences less abrupt speed variations for a shorter period of time as the target vehicle begins to merge into the lane occupied by the host vehicle.

Figure 12:
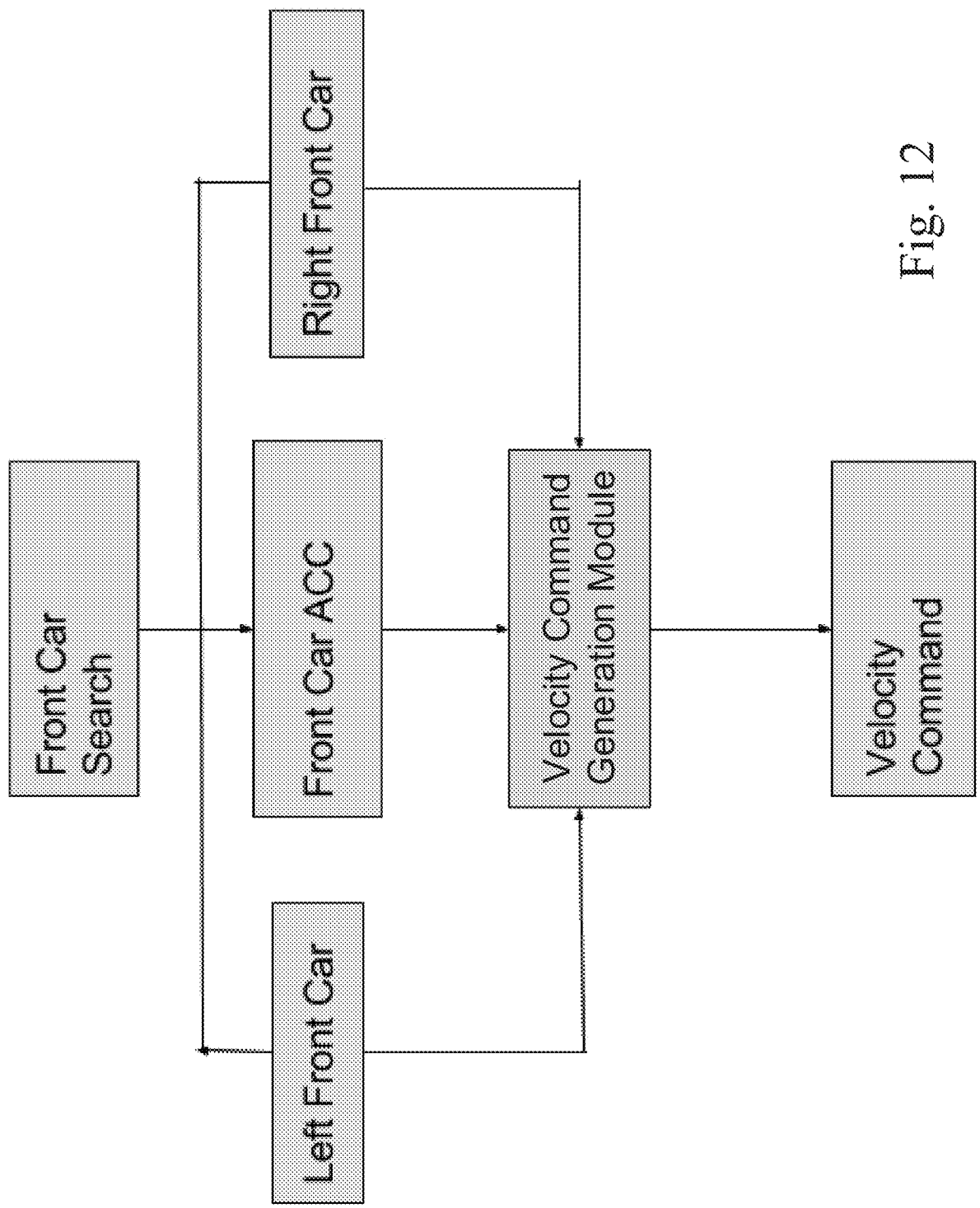
FIG. 12 is a flow diagram that illustrates an example embodiment of a system and method for adaptive cruise control with proximate vehicle detection.

Referring now to FIG. 12, a flow diagram illustrates an example embodiment of a system and method for adaptive cruise control with proximate vehicle detection. The example embodiment can be configured to initially detect the presence of any target vehicles within a sensitive zone in front of a host vehicle, to the left of the host vehicle, and to the right of the host vehicle. The velocity command generation module 175 can be configured to determine the relative speed and the separation distance between each of the detected target vehicles relative to the host vehicle. The velocity command generation module 175 can be configured to generate a velocity command 220 to adjust the speed of the host vehicle based on the relative speeds and separation distances between the host vehicle and the target vehicles to maintain a safe separation between the host vehicle and the target vehicles.

Figure 13:
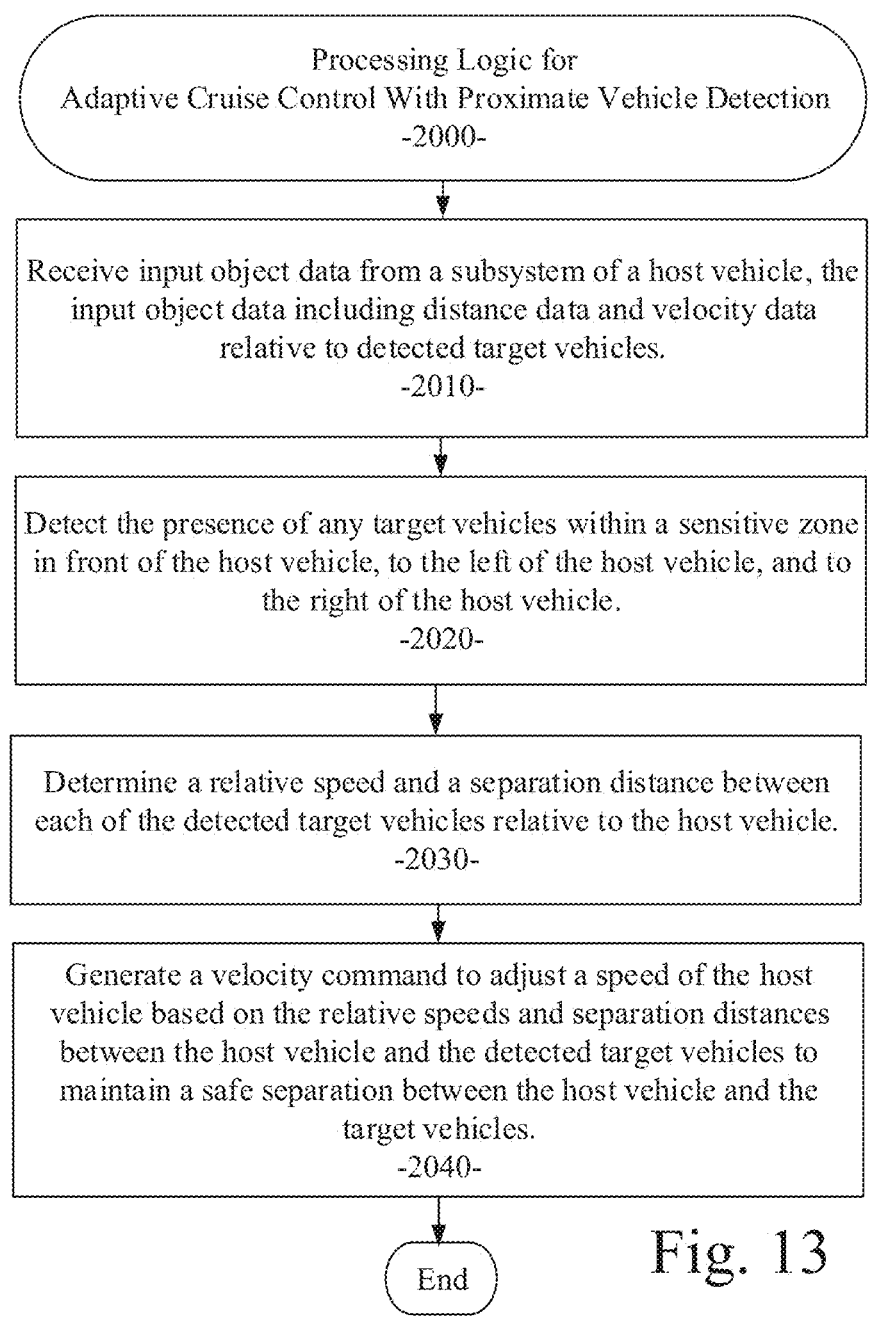
FIG. 13 is another flow diagram that illustrates an example embodiment of a system and method for adaptive cruise control with proximate vehicle detection.

Referring now to FIG. 13, another flow diagram illustrates an example embodiment of a system and method 2000 for adaptive cruise control with proximate vehicle detection. The example embodiment can be configured for: receiving input object data from a subsystem of a host vehicle, the input object data including distance data and velocity data relative to detected target vehicles (processing block 2010); detecting the presence of any target vehicles within a sensitive zone in front of the host vehicle, to the left of the host vehicle, and to the right of the host vehicle (processing block 2020); determining a relative speed and a separation distance between each of the detected target vehicles relative to the host vehicle (processing block 2030); and generating a velocity command to adjust a speed of the host vehicle based on the relative speeds and separation distances between the host vehicle and the detected target vehicles to maintain a safe separation between the host vehicle and the target vehicles (processing block 2040).

As used herein and unless specified otherwise, the term "mobile device" includes any computing or communications device that can communicate with the in-vehicle control system 150 and/or the adaptive cruise control module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 105 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the adaptive cruise control module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 105 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the adaptive cruise control module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the adaptive cruise control module 200 can be implemented using systems that enhance the security of the execution environment, thereby improving security and reducing the possibility that the in-vehicle control system 150 and/or the adaptive cruise control module 200 and the related services could be compromised by viruses or malware. For example, the in-vehicle control system 150 and/or the adaptive cruise control module 200 can be implemented using a Trusted Execution Environment, which can ensure that sensitive data is stored, processed, and communicated in a secure way.

Figure 14:
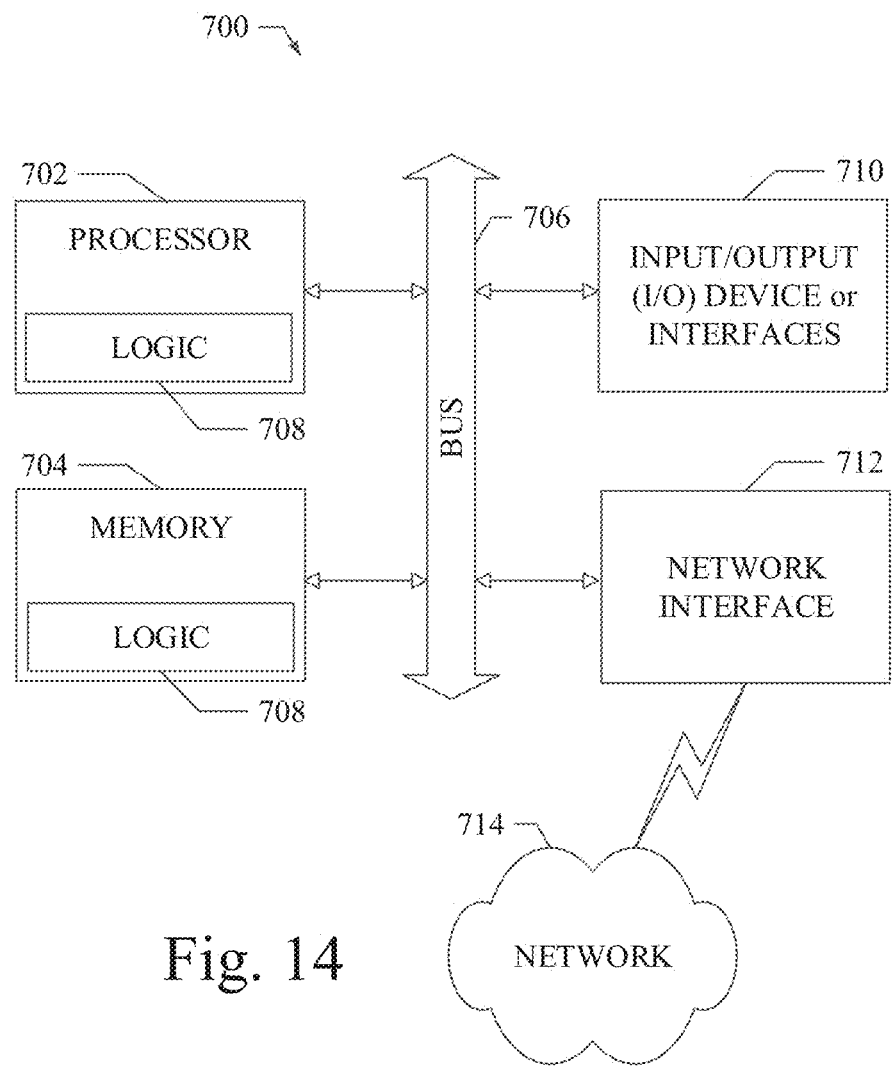
FIG. 14 shows a diagrammatic representation of machine in the example form of a computer system within which a set of instructions when executed may cause the machine to perform any one or more of the methodologies discussed herein.

FIG. 14 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are incorporated into the Detailed Description, with each claim standing on its own as a separate embodiment.

What is claimed is:

1. A system comprising:
a data processor; and
an adaptive cruise control module, executable by the data processor, being configured to:
receive input object data from a subsystem of a host vehicle, the input object data comprising distance data and velocity data relative to a target vehicle, wherein the input object data comprises camera image data processed by an image data processor to detect the target vehicle or other objects proximate to the host vehicle;
detect the presence of any target vehicle within a sensitive zone in front of the host vehicle, to the left of the host vehicle, and to the right of the host vehicle;
determine a relative speed and a separation distance between the target vehicle relative to the host vehicle; and
generate a velocity command to adjust a speed of the host vehicle based on the relative speed and the separation distance between the host vehicle and the target vehicle to maintain a safe separation between the host vehicle and the target vehicle, wherein the velocity command comprises a linear weighted sum of a speed of the target vehicle, the relative speed, and the separation distance.

2. The system of claim 1 wherein the input object data comprises distance data from one or more light imaging, detection, and ranging (LIDAR) sensors.

3. The system of claim 1 wherein the sensitive zone is a region around the host vehicle within pre-defined distance thresholds, the pre-defined distance thresholds being defined separately for an area in front of the host vehicle, an area to the left of the host vehicle, and an area to the right of the host vehicle.

4. The system of claim 3 wherein the pre-defined distance threshold for the area in front of the host vehicle is greater than the pre-defined distance threshold for the area to the left of the host vehicle and greater than the pre-defined distance threshold for the area to the right of the host vehicle.

5. The system of claim 1 being further configured to compute differentials ($\Delta d$) of the separation distance between the target vehicle and the host vehicle over time.

6. The system of claim 1 being further configured to compute differentials ($\Delta v$) of speeds of the target vehicle relative to the host vehicle over time.

7. The system of claim 1 being further configured to compute a predicted position and speed of the target vehicle at a future point in time.

8. The system of claim 1 being further configured to direct a vehicle control subsystem of the host vehicle to cause the host vehicle to achieve a speed corresponding to the velocity command.

9. A method comprising:
receiving input object data from a subsystem of a host vehicle, the input object data comprising distance data and velocity data relative to a target vehicle, wherein the input object data comprises camera image data processed by an image data processor to detect the target vehicle or other objects proximate to the host vehicle;
detecting the presence of any target vehicle within a sensitive zone in front of the host vehicle, to the left of the host vehicle, and to the right of the host vehicle;
determining a relative speed and a separation distance between the target vehicle relative to the host vehicle; and
generating a velocity command to adjust a speed of the host vehicle based on the relative speed and the separation distance between the host vehicle and the target vehicle to maintain a safe separation between the host vehicle and the target vehicle, wherein the velocity command comprises a linear weighted sum of a speed of the target vehicle, the relative speed, and the separation distance.

10. The method of claim 9 wherein the relative speed and the separation distance are measured by using a radar or one or more light imaging, detection, and ranging (LIDAR) sensors.

11. The method of claim 9 wherein the sensitive zone is a region around the host vehicle within pre-defined distance thresholds, the pre-defined distance thresholds being defined separately for an area in front of the host vehicle, an area to the left of the host vehicle, and an area to the right of the host vehicle, wherein the pre-defined distance thresholds are substantively the same.

12. The method of claim 9 wherein the sensitive zone is a region around the host vehicle within pre-defined distance thresholds, the pre-defined distance thresholds being defined separately for an area in front of the host vehicle, an area to the left of the host vehicle, and an area to the right of the host vehicle, wherein the pre-defined distance threshold for the area to the right of the host vehicle is greater than the pre-defined distance threshold for the area to the left of the host vehicle.

13. The method of claim 9 comprising computing a predicted position and speed of the target vehicle at a future point in time according to differentials ($\Delta d$) of the separation distance between the target vehicle and the host vehicle over time and differentials ($\Delta v$) of speed of the target vehicle relative to the host vehicle over time.

14. The method of claim 13 comprising determining whether the target vehicle encroaches a pre-defined safety boundary around the host vehicle according to the predicted position of the target vehicle and the separation distance.

15. The method of claim 14 comprising adjusting the speed of the host vehicle according to the velocity command to maintain the relative speed and the separation distance to avoid the target vehicle from encroaching the pre-defined safety boundary.

16. The method of claim 14 comprising adjusting the speed of the host vehicle according to the velocity command to maintain a safe relative speed between the target vehicle and the host vehicle.

17. A non-transitory machine-useable storage medium embodying instructions which, when executed by a machine, cause the machine to:
receive input object data from a subsystem of a host vehicle, the input object data comprising distance data and velocity data relative to a target vehicle, wherein the input object data comprises camera image data processed by an image data processor to detect the target vehicle or other objects proximate to the host vehicle;
detect the presence of any target vehicle within a sensitive zone in front of the host vehicle, to the left of the host vehicle, and to the right of the host vehicle;

determine a relative speed and a separation distance between the target vehicle relative to the host vehicle; and generate a velocity command to adjust a speed of the host vehicle based on the relative speed and the separation distance between the host vehicle and the target vehicle to maintain a safe separation between the host vehicle and the target vehicle, wherein the velocity command comprises a linear weighted sum of a speed of the target vehicle, the relative speed, and the separation distance.

18. The non-transitory machine-useable storage medium of claim 17 wherein a weight coefficient for configuring the significance of the speed of the target vehicle is substantively equal to 1.

19. The non-transitory machine-useable storage medium of claim 17 wherein the a weight coefficient for configuring the significance of the relative speed and a weight coefficient for configuring the significance of the separation distance are user-configurable.

20. The non-transitory machine-useable storage medium of claim 19 wherein a dynamic gain is introduced to modify the velocity command, wherein the machine is configured to direct a vehicle control subsystem of the host vehicle to cause the host vehicle to achieve a speed corresponding to the velocity command modified by the dynamic gain.

* * * * *